United States Patent [19]
Wilbanks

[11] Patent Number: 5,595,018
[45] Date of Patent: Jan. 21, 1997

[54] MOSQUITO KILLING SYSTEM

[76] Inventor: Alvin D. Wilbanks, 3519 W. County Rd., Osceola, Ark. 72370

[21] Appl. No.: 395,910

[22] Filed: Feb. 28, 1995

[51] Int. Cl.⁶ .................................................. A01M 1/22
[52] U.S. Cl. .............................................. 43/112; 43/139
[58] Field of Search .............................. 43/112, 113, 139

[56] References Cited

U.S. PATENT DOCUMENTS

| | | | |
|---|---|---|---|
| 3,041,773 | 7/1962 | Gagliano | 43/139 |
| 3,319,374 | 5/1967 | Gawne | 43/139 |
| 4,182,069 | 1/1980 | DeYoreo | 43/112 |
| 4,454,677 | 6/1984 | Chuang | 43/112 |
| 4,523,404 | 6/1985 | DeYoreo | 43/112 |
| 4,696,126 | 9/1987 | Grothaus | 43/112 |
| 4,852,296 | 8/1989 | Swanson | 43/112 |
| 5,020,270 | 6/1991 | Lo | 43/112 |
| 5,205,064 | 4/1993 | Nolen | 43/112 |
| 5,255,468 | 10/1993 | Cheshire | 43/112 |
| 5,301,458 | 4/1994 | DeYoreo | 43/112 |

*Primary Examiner*—Kurt Rowan

[57] ABSTRACT

A portable mosquito killing system for use indoors and out of doors is disclosed. The system includes a base member having a plurality of apertures disposed on a floor and a roof, a canopy member having a flat top section and a plurality of outwardly sloped downwardly disposed sides. A cylindrical tower is disposed between the base and the roof and has an inner shell and an outer network of electrified low voltage wires in a spaced apart relationship for forming an annular zone therein. A plurality of upstanding non-conducting rods are also in the annular zone. A transformer converts current from 120 volts to a lower voltage for delivery to the low voltage wired network. A thermostat maintains the heat emitting tube in an operating temperature range, and a pilot light indicates the electrical operating status of the transformer and the heat emitting tube.

5 Claims, 4 Drawing Sheets

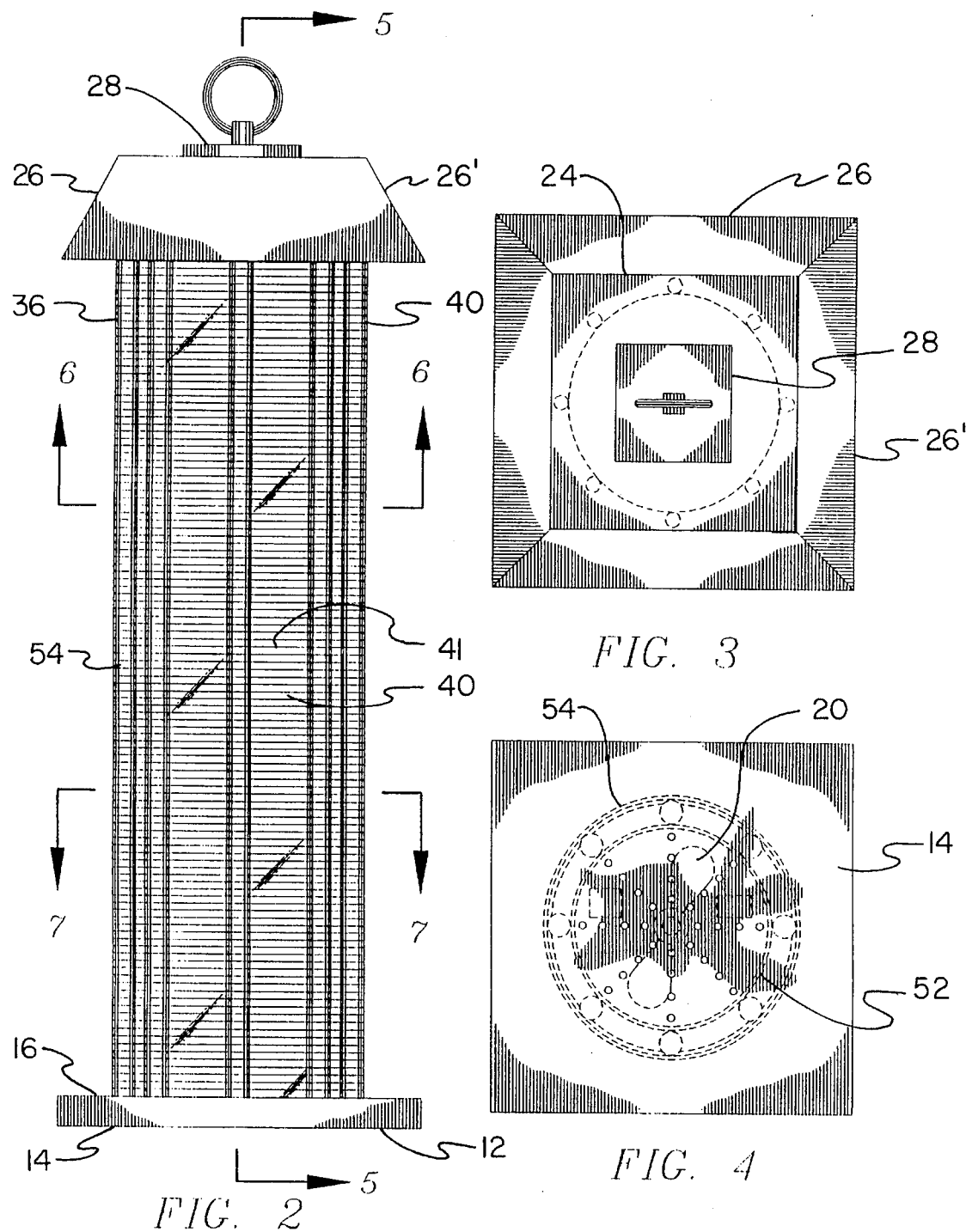

MOSQUITO KILLING SYSTEM

BACKGROUND OF THE INVENTION

1. Field of the Invention

The present invention relates to a new and improved mosquito killing system and, more particularly, pertains to a portable mosquito killing system that attracts mosquitoes to a killing zone with heat and aromatics and further has a self-cleaning mechanism to remove the electrocuted insect remains from the killing zone.

2. Description of the Prior Art

The use of insect killing apparatus' is known in the prior art. More specifically, insect killing apparatus' heretofore devised and utilized for the purpose of insect eradication having many parts and being difficult to operate and maintain in conditions typically found in situations requiring the killing of insects, and in particular, hungry human biting mosquitoes are known to consist basically of familiar, expected, and obvious structural configurations, notwithstanding the myriad of designs encompassed by the crowded prior art which has been developed for the fulfillment of countless objectives and requirements.

The prior art discloses a large number of insect killing apparatus. By way of example, U.S. Pat. No. 4,891,904 issued to Tabita discloses a heating device for electrocuting mosquitoes and having a heating assembly in an interior chamber therein.

U.S. Pat. No. 5,205,064 issued to Nolen discloses a cylindrical device having a pressurized canister and a cam mechanism for periodically discharging the contents of the pressurized canister to attract insects to a electrified grid for subsequent electrocution of the insects.

U.S. Pat. No. 5,255,468 issued to Cheshire, Jr. discloses an insect tracking and capturing apparatus having a light source to attract insects and a fan to create an air current for capturing the insects in the air current created and delivering the insects to a electrified grid for electrocution.

U.S. Pat. No. 5,241,779 issued to Lee discloses an apparatus for collecting and killing insects having a heat source to attract the insect and an killing grid for electrocuting the insects and having a container therebelow to collect the dead insects in a liquid chamber therein.

U.S. Pat. No. 4,951,414 issued to Mewissen discloses a device for electrocuting insects having a housing with a low pressure mercury vapor discharge light therein and an electrically connected ballast for illuminating the mercury vapor lamp and further for generating a high voltage for electrocuting the insects on a grid.

In this respect, the mosquito killing system according to the present invention substantially departs from the conventional concepts and designs of the prior art, and in doing so provides an apparatus primarily developed for the purpose of a portable mosquito killing system that attracts mosquitoes to a killing zone with heat and aromatics and further has a self-cleaning mechanism to remove the electrocuted insect remains from the killing zone.

It is therefore an object of the present invention to provide a new and improved mosquito killing system which has all the advantages of the prior art insect killing apparatus and none of the disadvantages.

It is another object of the present invention to provide a new and improved mosquito killing system which may be easily and efficiently manufactured and marketed.

It is a further object of the present invention to provide a new and improved mosquito killing system which is of a durable and reliable construction.

An even further object of the present invention is to provide a new and improved mosquito killing system which is susceptible of a low cost of manufacture with regard to both materials and labor, and which accordingly is then susceptible of low prices of sale to the consuming public, thereby making such a mosquito killing system economically available to the buying public.

Still yet another object of the present invention is to provide a new and improved mosquito killing system which provides in the apparatuses and methods of the prior art some of the advantages thereof, while simultaneously overcoming some of the disadvantages normally associated therewith.

Even still another object of the present invention is to provide a portable mosquito killing system that attracts mosquitoes to a killing zone with heat and aromatics and further has a self-cleaning mechanism to remove the electrocuted insect remains from the killing zone.

Lastly, it is an object of the present invention to provide a portable mosquito killing system for use indoors and out of doors comprising a base member having a plurality of apertures disposed on a floor and a roof, a canopy member having a flat top section and a plurality of outwardly sloped downwardly disposed sides, a cylindrical tower therebetween having an inner shell and an outer network of electrified low voltage wires in a spaced apart relationship for forming an annular zone therein, and a plurality of upstanding non-conducting rods therein the annular zone, transformer means for converting current from 120 volts to a lower voltage for delivery to the low voltage wired network, thermostatic means for maintaining the heat emitting tube in an operating temperature range, and status means for indicating the electrical operating status of the transformer means and the heat emitting tube.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Therefore, it can be appreciated that there exists a continuing need for a new and improved mosquito killing system which can be used for attracting mosquitoes to a killing zone with heat and aromatics and further having a self-cleaning mechanism to remove the electrocuted insect remains from the killing zone. In this regard, the present invention substantially fulfills this need.

SUMMARY OF THE INVENTION

In view of the foregoing disadvantages inherent in the known types of insect killing apparatus now present in the prior art, the present invention provides a new and improved mosquito killing system. As such, the general purpose of the present invention, which will be described subsequently in greater detail, is to provide a new and improved mosquito killing system and methods which have all the advantages of the prior art and none of the disadvantages.

To attain this, the present invention essentially comprises a portable mosquito killing system for use indoors and out of doors having a base member having a plurality of apertures disposed on a floor and a roof, and further having a fan therebetween for urging gaseous flow communication therethrough the plurality of apertures. A canopy member is disposed above the roof and has a flat top section and a plurality of outwardly sloped downwardly disposed sides. The flat top section has an outer surface adapted for suspension communication with a chain and an inner surface adapted for electrical communication with a heat emitting quartz tube. A cylindrical tower is disposed between the base and roof and has an inner shell and an outer network of electrified low voltage wires in a spaced apart relationship for forming an annular zone therein. Further, a plurality of upstanding non-conducting rods are disposed therein the annular zone. The inner shell further includes a heating zone therein in an upper portion thereof and a second plurality of apertures on a periphery of the shell for urging gas flow communication from the heating zone through the second plurality of apertures to the outer network of wires for attracting the insects with warmed aromatic air.

A transformer converts current from 120 volts to a lower voltage for delivery to the low voltage wired network, and a thermostat maintains the heat emitting tube in an operating temperature range of about between 100 to 120 degrees fahrenheit. Finally, a pilot light indicates the electrical operating status of the transformer and the heat emitting tube.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a front elevational view of the invention disclosing the base, the roof top, with the suspension ring, and the upstanding cylindrical tower therebetween.

FIG. 3 is a top plan view of the invention as shown in FIG. 1.

FIG. 4 is a bottom plan view of the invention as disclosed in FIG. 1.

FIG. 5 discloses a low CFM fan oriented in the base therebeneath the tower for discharging an aromatic gas into the annular space therein the tower.

FIG. 6 discloses a quartz tube oriented in a downward disposition in the center of the tower and a plurality of wires for electrocuting the insects in an arcuate network orientation circumadjacent the tower and further having a plurality of non-conducting upstanding rods therebetween the electrocution wires and the arcuate tower.

FIG. 7 discloses the plurality of apertures in the base of the tower for urging gaseous flow communication between the low CFM fan and the annular space therein the tower.

The same reference numerals refer to the same parts throughout the various Figures.

DESCRIPTION OF THE PREFERRED EMBODIMENT

Figure 1:
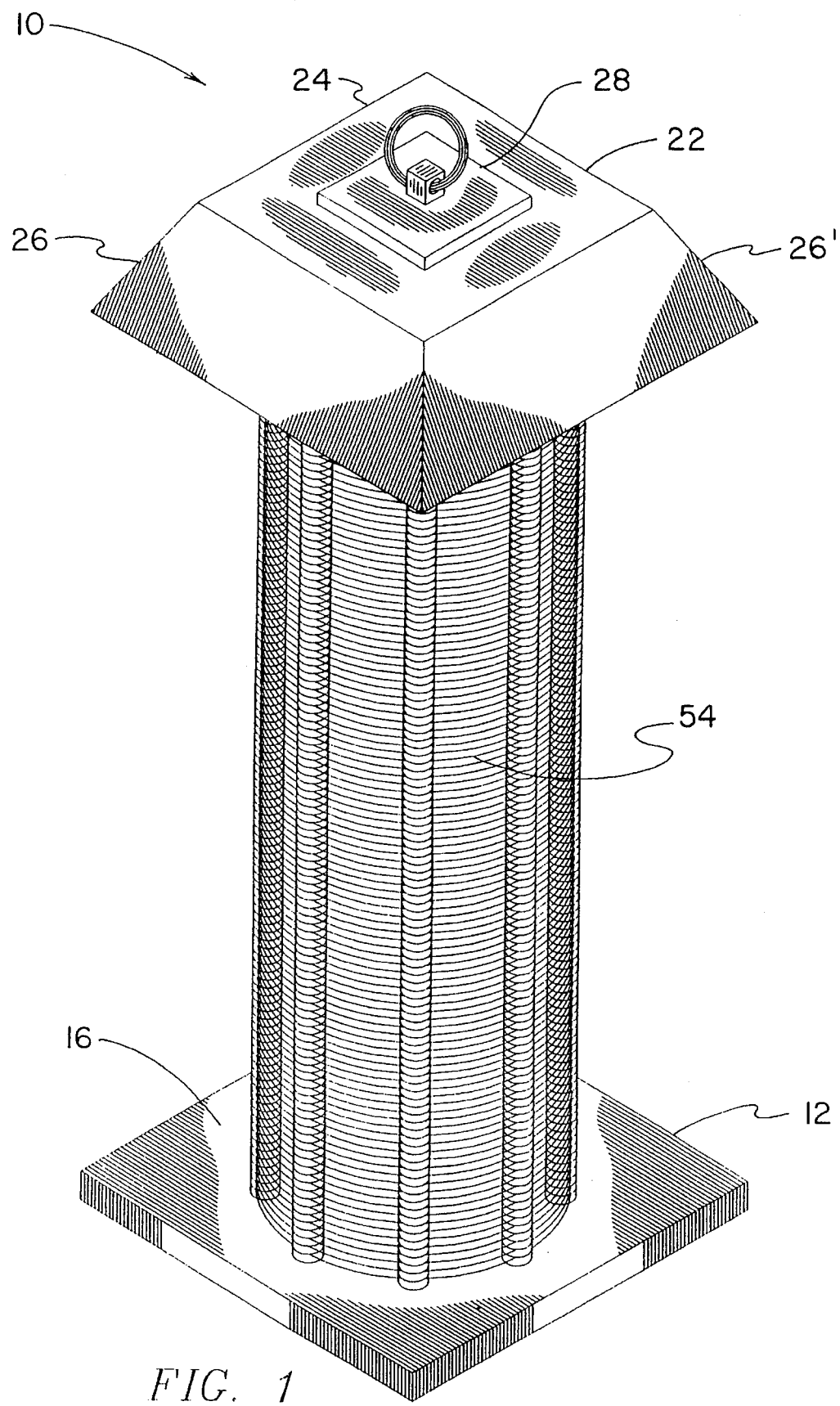
FIG. 1 is a perspective illustration of the preferred embodiment of the mosquito killing system constructed in accordance with the principles of the present invention.
Figures 5, 6, 7:
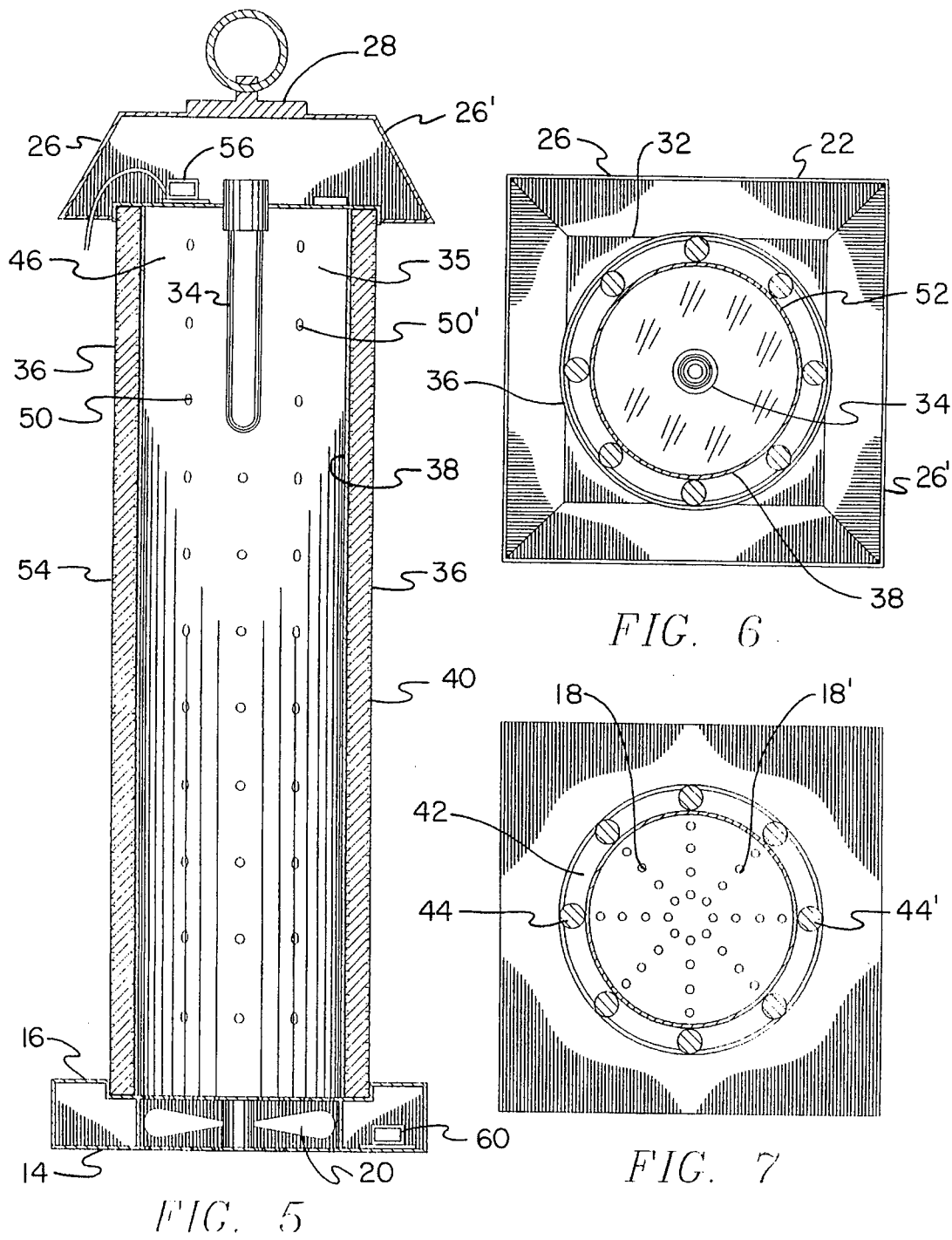
FIG. 5 is a vertical cross-sectional view of the invention taken along viewing lines 5—5 in FIG. 2.
FIG. 6 is a horizontal cross-sectional view taken along viewing lines 6—6 in FIG. 2.
FIG. 7 is a horizontal cross-sectional view taken along viewing lines 7—7 in FIG. 2.
Figures 8, 9:
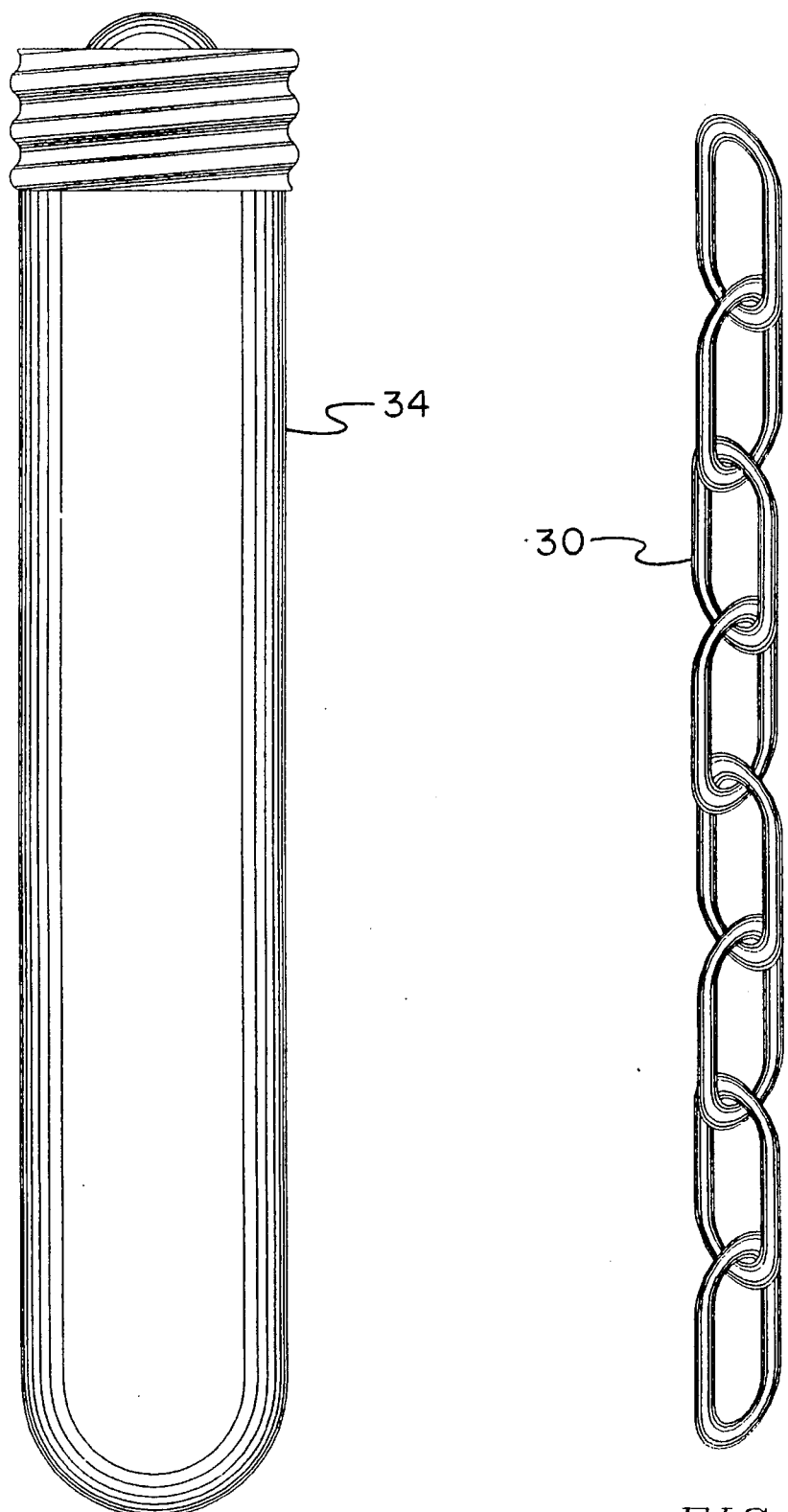
FIG. 8 is a front elevational view of the heat emitting quartz tube as disclosed in FIG. 5.
FIG. 9 is a front elevational view of a typical suspension chain used to suspend the invention from a tree or post in an outdoor setting.

With reference now to the drawings, and in particular to FIGS. 1 through 9 thereof, the preferred embodiment of the new and improved mosquito killing system embodying the principles and concepts of the present invention and generally designated by the reference numeral 10 will be described.

The present invention, the new and improved mosquito killing system is a system comprised of a plurality of components. The components in their broadest context include a tower, an electrified grid, a quartz heater, and a fan. Each of the individual components is specifically configured and correlated one with respect to the other to attain the desired objectives.

The system attracts and kills mosquitoes. It works outside in open spaces or can be adapted to work in enclosed areas such as homes, offices, barns, or the like. The system can be made in different sizes depending upon the application and the intended location for use. The preferred embodiment comprises a cylindrical tower mounted on a plastic base and having a canopy member thereabove. The invention will bring needed relief to those people who wish to enjoy the outdoors without resorting to known carcinogenic lotions for insect repellency that are well known in the pharmacy arts.

Referring generally to FIG. 1, the invention comprises a new and improved portable mosquito killing system 10 for use indoors and out of doors. The system 10 has a base member 12 with a floor 14 and a roof 16. The floor 14 is adapted with a plurality of apertures 18, and further has a fan 20 therebetween for urging gaseous flow communication through the plurality of apertures 18. A canopy member 22 has a flat top section 24 and a plurality of outwardly sloped downwardly disposed sides 26, the flat top section 24 further has an outer surface 28 adapted for suspension communication with a chain 30 and an inner surface 32 adapted for electrical communication with a heat emitting quartz tube 34. The quartz tube 34 is downwardly disposed in an upper portion 35 of a cylindrical tower 36. The quartz tube 34 generates heat and is controlled by a thermostat 35 that is preset to maintain the quartz tube 34 at an operating temperature of 100–120 degrees fahrenheit. Heat is a well know attractant to insects, and in particular mosquitoes.

The cylindrical tower 36 is oriented therebetween the base 12 and roof 16 and has an inner shell 38 and an outer network 40 of electrified low voltage wires 41 in a spaced apart relationship. The tower 36 is arcuate in shape and the plurality of thin metallic conducting wires 41 are oriented circumadjacent the tower 36 in a annular spaced apart relationship for forming an annular zone 42 therein. Further, a plurality of upstanding non-conducting rods 44 are disposed within the annular zone 42. The inner shell 38 also has a heating zone 46 in an upper portion 48 thereof and a second plurality of apertures 50 on a periphery 52 of the shell 38 for urging gas flow communication from the heating zone 46 through the second plurality of apertures 50 to the outer network of wires 41. The second plurality of apertures 50 on the arcuate periphery 52 allows the heat to escape from the inner shell 38 of the tower 36 to the electrical grid 41 for attracting the mosquitoes to a killing zone 54 with a warm aromatic air.

Transformer means 56 converts current from 120 volts to a lower voltage for delivery to the low voltage network of wires 41. The thermostat means 35 maintains the heat emitting tube 34 in an operating temperature range of about between 100 to 120 degrees fahrenheit. Finally, a status means 60 indicates the electrical operating status of the transformer means 56 and the heat emitting tube 34.

When the system 10 is plugged in and activated, the wires 41 carry an electrical charge that electrocute a mosquito when they enter the killing zone 54 and come in contact with any wire 41 on the network 40.

In use and operation, the system 10 is merely placed on the ground or suspended from a convenient tree or other overhead device with the chain 30 and plugged into a standard 120 volt outlet. The current provided to the transformer 56 is then distributed to the metallic grid 40 for killing mosquitoes and to the quartz tube 34 to generate the necessary heat to attract the mosquitoes to the system 10 for subsequent electrocution on the low voltage wires 41. The transformer output voltage can be preselected to disintegrate the mosquitoes as they are electrocuted. In effect, the transformer 56 provides a self-cleaning mechanism to eliminate the problem of removing the remains of the electrocuted insects from the system 10.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved portable mosquito killing system for use indoors and out of doors comprising, in combination:

a base member having a floor having a plurality of apertures and a roof, and further having a fan therebelow the floor for urging gaseous flow communication therethrough the plurality of apertures;

a canopy member having a flat top section and a plurality of outwardly sloped downwardly disposed sides, the flat top section having an outer surface having means for suspension communication with a chain and an inner surface having means for electrical communication with a heat emitting quartz tube;

a cylindrical tower therebetween having an inner shell and an outer network of electrified low voltage wires in a spaced apart relationship for forming an annular zone therein, and a plurality of upstanding non-conducting rods therein the annular zone, the inner shell further having a heating zone therein in an upper portion thereof and a second plurality of apertures on a periphery of the inner shell for such that said fan urges gas flow communication from the heating zone through the second plurality of apertures to the outer network of wires for attracting the insects to a warmed aromatic air;

transformer means for converting current from 120 volts to a variable lower voltage for delivery to the low voltage wired network;

thermostatic means for maintaining the heat emitting tube in an operating temperature range of about between 100 to 120 degrees fahrenheit; and status means for indicating the electrical operating status of the transformer means and the heat emitting tube.

2. A mosquito killing system for use indoors and out of doors comprising a base member having a floor having a plurality of apertures and a roof, a canopy member having a top section and a plurality of outwardly sloped downwardly disposed sides, a cylindrical tower therebetween having an inner shell and an outer network of electrified low voltage wires in a spaced apart relationship for forming an annular zone therein, and a plurality of upstanding non-conducting spacer rods within the annular zone, the base member further including means for urging gasseous flow through the plurality of apertures in the floor and then through the apertures in the inner shell of the tower, and then through the spacer rods and then through the low voltage wires, and then to the exterior of the system to attract mosquitos, transformer means for converting current from 120 volts to a variable lower voltage for delivery to the low voltage wires, a heat emitting tube within in the tower and thermostatic means coupled with respect to the heat emitting tube for maintaining the heat emitting tube in an operating temperature range, and status means for indicating the electrical operating status of the transformer means and the heat emitting tube.

3. A portable mosquito killing system for use indoors and out of doors as recited in claim 2 wherein the means for urging gaseous flow communication therethrough the plurality of apertures is a fan.

4. A portable mosquito killing system for use indoors and out of doors as recited in claim 2 wherein the flat top section further includes an outer surface having means for suspension communication with a chain and an inner surface having means for electrical communication with a heat emitting quartz tube.

5. A portable mosquito killing system for use indoors and out of doors as recited in claim 2 wherein the temperature range is about between 100 to 120 degrees fahrenheit.

* * * * *